Figure 1:
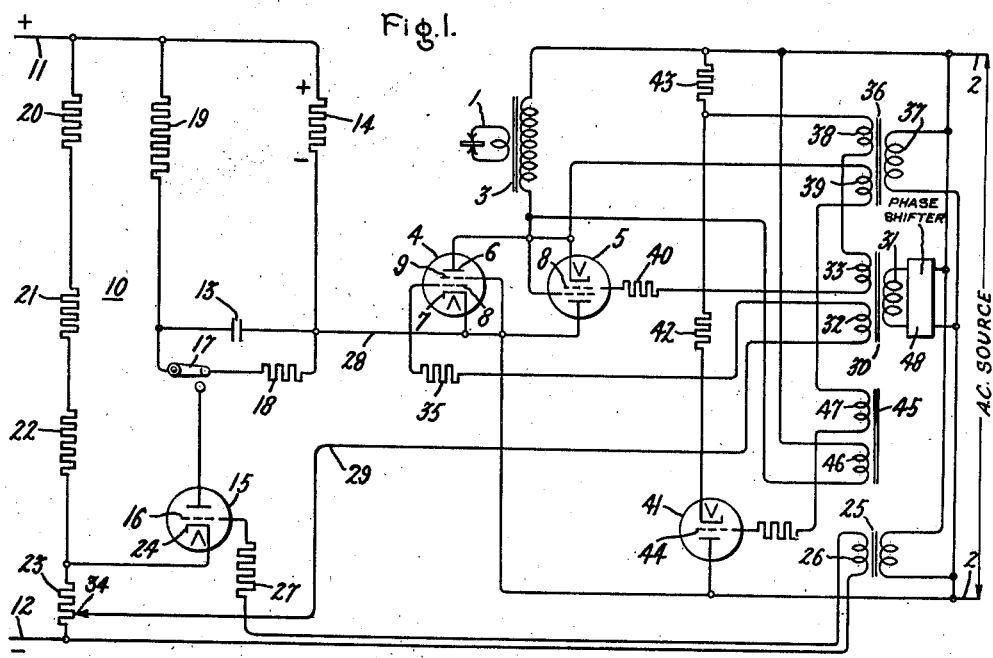

May 19, 1942.   M. E. BIVENS   2,283,719
ELECTRIC VALVE CIRCUITS
Filed Feb. 3, 1941   2 Sheets-Sheet 1

Inventor:
Maurice E. Bivens,
by Harry E. Dunham
His Attorney.

Patented May 19, 1942

2,283,719

UNITED STATES PATENT OFFICE 2,283,719

ELECTRIC VALVE CIRCUITS

Maurice E. Bivens, Schenectady, N. Y., assignor to General Electric Company, a corporation of New York Application February 3, 1941, Serial No. 377,098

15 Claims. (Cl. 250—27)

My invention relates to electric circuits and more particularly to electric valve circuits for effecting energization of a load circuit from an alternating current supply circuit.

It is frequently desirable in the control of electric valve circuits to employ arrangements which effect energization of the load circuit from an alternating current supply circuit during accurately determinable intervals of time, and to provide means which permits accurate control of the amount of energy transmitted to a load circuit during those intervals of time. For example, in electric resistance welding systems electric valve apparatus of the controlled type has been employed to interconnect an alternating current supply circuit and a load circuit, and the conductivity of the electric valve means is controlled to effect the desired energization of the load circuit. In accordance with the teachings of my invention described hereinafter, I provide an improved control system for electric valve apparatus of this nature.

It is an object of my invention to provide a new and improved electric control system.

It is another object of my invention to provide a new and improved electric control system for electric valve translating apparatus.

It is a further object of my invention to provide a new and improved electric valve translating system for interconnecting an alternating current supply circuit and an alternating current load circuit, and whereby the load circuit may be energized during a predetermined interval of time and whereby the amount of current transmitted to the load circuit during said interval is accurately determinable.

Briefly stated, in the illustrated embodiments of my invention I provide an electric valve translating circuit connected between an alternating current supply circuit and a load circuit, which may be an alternating current welding circuit. A pair of reversely connected electric valves are employed to transmit alternating current to the load, and these valves are arranged in a leading and trailing relationship so that half cycles of current of both polarities are transmitted to the load circuit. Apparatus is provided for rendering the electric valves conductive at precisely the same instants during the respective positive half cycles of applied anode-cathode voltage so that the amounts of current transmitted by each electric valve during the respective half cycles of conduction are exactly equal.

More particularly, my invention relates to improvements in electric valve control circuits in the nature of that described and claimed in United States Letters Patent No. 2,174,379, granted September 26, 1939, upon an application of Dudley C. Chambers, filed February 27, 1937.

Figure 2:
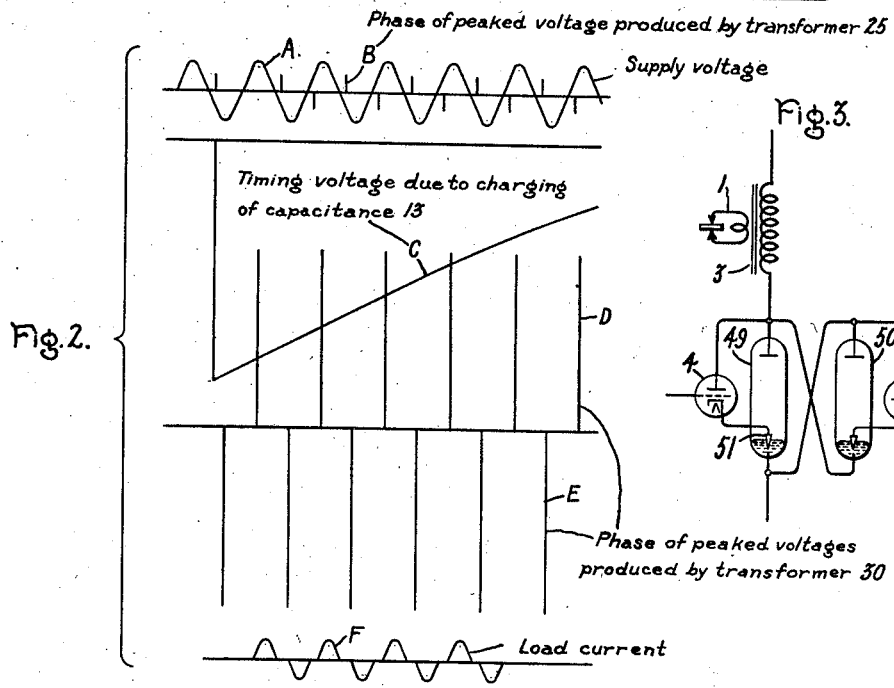
Figure 3:
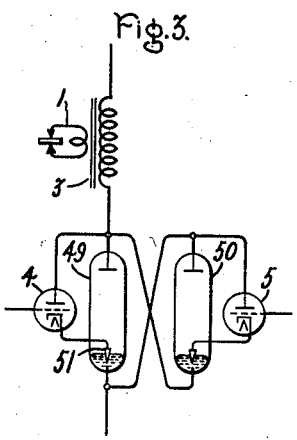
Figure 4:
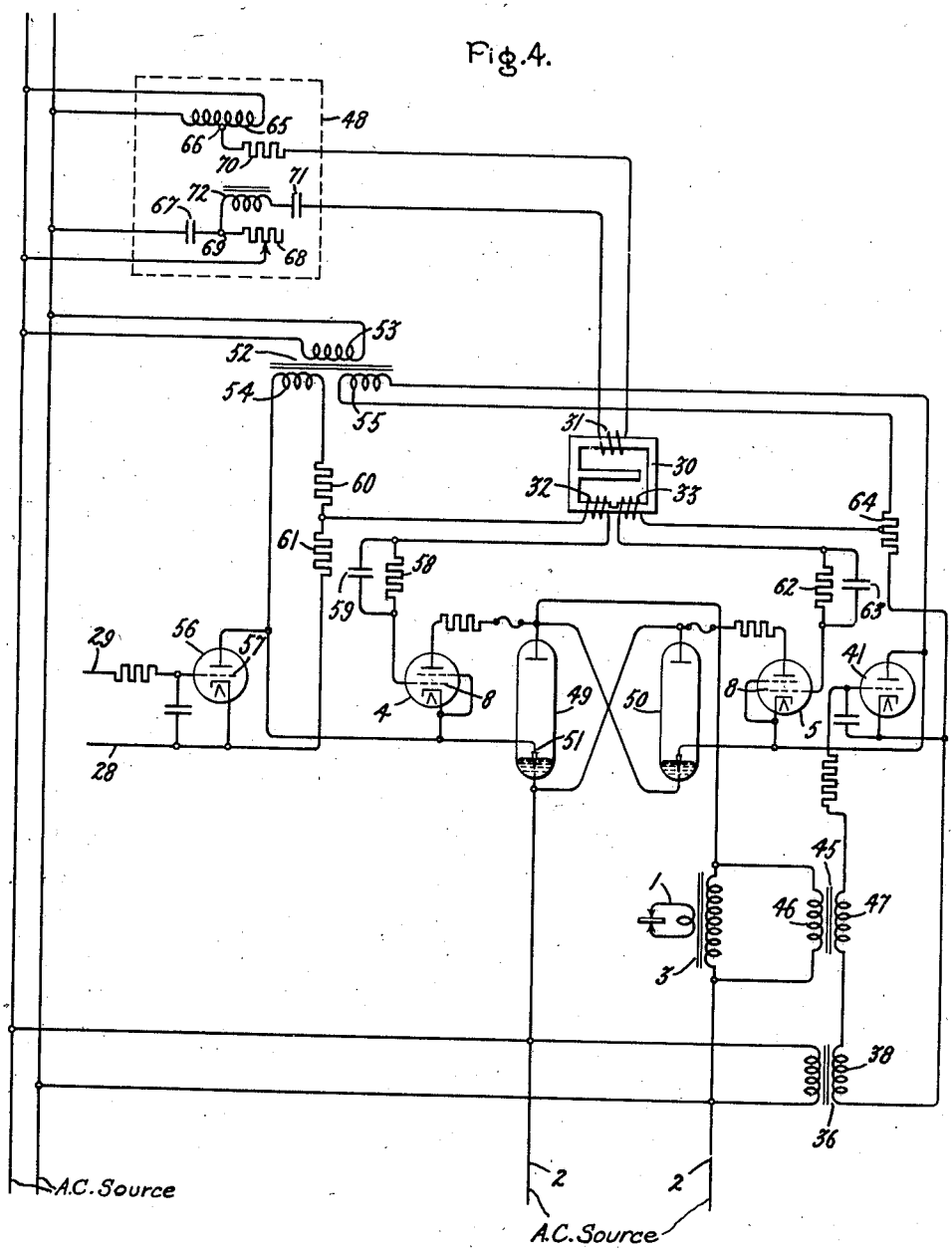

For a better understanding of my invention, reference may be had to the following description taken in connection with the accompanying drawings, and its scope will be pointed out in the appended claims. Fig. 1 diagrammatically illustrates an embodiment of my invention as applied to an electric resistance welding system, and Fig. 2 represents certain operating characteristics of the arrangement shown in Fig. 1. Fig. 3 represents a modification of the arrangement shown in Fig. 1 where power valves capable of transmitting large amounts of current are controlled by means of the arrangement shown in Fig. 1; and Fig. 4 represents a further modification of the arrangement shown in Fig. 1 wherein an improvement is provided for controlling the leading control electric valve.

Referring now to Fig. 1, my invention is there illustrated as applied to an electric translating system for energizing a load circuit, such as a welding circuit 1, from an alternating current supply circuit 2 and including a transformer 3 and a pair of reversely connected electric valve means 4 and 5. Electric valve means 4 and 5 may be of the type comprising an ionizable medium, such as a gas or a vapor, and each includes an anode 6, a cathode 7 and a control member 8. Where the electric valve means employed is of the type utilizing a hot cathode, a shield grid or control member 9 may also be employed and this control member may be connected to the cathode.

As a means for producing a timing voltage which controls the period of conductivity of the electric valve means 4 and, hence, controls the period of energization of the welding circuit 1, I provide a control or timing circuit 10 which may include a suitable source of direct current comprising conductors 11 and 12. A capacitance 13 is charged from the source of direct current through a resistance 14 and an electric discharge device 15. The electric discharge device 15 may be of the type comprising an ionizable medium, such as a gas or a vapor, and including a control grid 16. A suitable contactor or switch 17 is connected in the anode-cathode circuit of the electric discharge device 15 and is arranged to open that circuit and to close a discharge path for the capacitance 13. The discharge path includes a discharge resistance 18. The left-hand terminal of the capacitance 13 is connected to conductor 11 through a resistance 19 which is of substantially greater value than the ohmic resistance of resistance 14. I also provide a voltage divider connected across the direct current source and this voltage divider may comprise resistances 20, 21, 22 and 23. Cathode 24 of electric discharge device 15 is connected to a point of the voltage divider somewhat positive relative to the point to which the grid 16 is connected. Electric discharge device 15 is rendered conductive at a predetermined instantaneous value of the voltage of the alternating current supply circuit 2 by means of a peaking transformer 25 having a secondary winding 26 which is connected between the negative conductor 12 of the direct current source and the grid 16 of electric discharge device 15 through a current limiting resistance 27. In this manner a negative biasing potential is impressed on the grid 16 by utilizing the voltage drop appearing across resistance 23.

Electric valve means 4 is rendered conductive for a predetermined interval of time determined by the electrical quantity derived from the timing circuit 10. Timing circuit 10 is connected to cathode 7 of electric valve means 4 through conductor 28, and control member 8 of electric valve means 4 is connected to a relatively negative potential derived from the voltage divider through conductor 29. I provide means for producing a voltage of peaked wave form, which is preferably a periodic voltage of peaked wave form, for rendering the electric valve means 4 and 5 conducting at a predetermined time during the respective half cycles of applied anode-cathode voltage. The means which produces the voltage of peaked wave form may comprise a saturable inductive device such as a peaking transformer 30 having a primary winding 31 and secondary windings 32 and 33. Secondary winding 32 is connected between an adjustable contact 34, associated with resistance 23 in the voltage divider, and control member 8 of electric valve means 4 through a current limiting resistance 35. The periodic voltage of peaked wave form furnished by winding 32 is insufficient in itself to overcome the effect of the biasing potential impressed on control member 8 and derived from the voltage divider. When cooperating with the timing voltage derived from timing circuit 10, the peaked voltage is effective to render the electric valve means 4 conductive at a precise time during each positive half cycle of a predetermined number of cycles of applied anode-cathode voltage.

Electric valve means 5 is arranged to trail the operation of the electric valve means 4; that is, the electric valve 5 is normally maintained nonconducting and conducts current in half cycles of voltage of predetermined polarity only when the electric valve means 4 conducts current during the immediately preceding half cycles of voltage of opposite polarity. As a means for maintaining the electric valve means 5 nonconducting, I employ suitable biasing means, such as a transformer 36, having a primary winding 37 and secondary windings 38 and 39. Secondary winding 38 is connected in series relation with secondary winding 33 of transformer 30 and is connected to control member 8 of electric valve means 5 through a current limiting resistance 40. The biasing potential provided by secondary winding 38 is sufficient to overcome the effect of the voltage of peaked wave form produced by secondary winding 33 of transformer 30 and, hence, the electric valve means 5 is normally maintained nonconducting.

In order to render ineffective the biasing potential produced by secondary winding 39 of transformer 36, I provide a circuit responsive to the conductivity of the electric valve means 4, or responsive to the current conducted by the electric valve means 4. This circuit may include an electric discharge device 41 which is preferably of the type employing an ionizable medium, such as a gas or a vapor, and also includes resistances 42 and 43. The electric discharge device 41 includes a control grid 44 and is poled relative to the alternating current circuit 2 so that it conducts current through resistance 43 in a direction to impress on the control member 8 of electric valve means 5 a positive voltage which, cooperating with the peaked voltage produced by a secondary winding 33, is sufficient to render the electric valve means 5 conducting.

To control the conductivity of electric discharge device 41 so that it conducts current only after energization of the load circuit 1 by the electric valve means 4, I provide a transformer 45 having a primary winding 46 which is connected to be responsive to the energization of the load circuit, and is shown in this embodiment as being responsive to the voltage appearing across the primary winding of transformer 3. Secondary winding 47 of transformer 45 is connected in series relation with a winding 39. The voltage produced by winding 47 when cooperating with the peaked voltage of winding 33 is sufficient to overcome the effect of winding 39, thereby rendering the electric discharge device 41 conductive upon each energization of transformer 3 by electric valve means 4.

In order to control the amount of current transmitted to the welding circuit 1 and, hence, to control the amount of power transmitted thereto, I provide a suitable phase shifting means 48 which may be of the type disclosed and claimed in United States Letters Patent No. 1,719,866, granted July 9, 1929, upon an application of E. F. W. Alexanderson, and which was filed March 9, 1927. The adjustment of the phase shifting device 48 simultaneously controls the phase relation of the peaked voltages impressed on the control members 8 of both electric valve means 4 and 5 and thereby simultaneously presets or preestablishes the amount of current conducted by each of these electric valve means during their respective half cycles of conduction.

The operation of the embodiment of my invention shown in Fig. 1 of the drawings will be explained by considering the operation of the circuit when it is desired to effect energization of the welding circuit 1 for a predetermined number of cycles of voltage of circuit 2. Normally, the electric valve means 4 and 5 are maintained nonconducting and, hence, the welding circuit 1 is not energized. The period of energization of the welding circuit 1 is determined by the timing circuit 10 and may be adjusted by movement of the adjustable contact 34 along resistance 23. With switch 17 in the position shown, the capacitance 13 is not charged and hence the potential of control member 8 is maintained negative relative to the cathode 7, so that the electric valve means 4 is nonconducting. The periodic voltage of peaked wave form produced by secondary winding 32 of transformer 30 is not sufficient in itself to overcome the effect of the negative biasing potential derived from the voltage divider.

When it is desired to effect energization of the welding circuit or to initiate energization of the welding circuit, switch 17 is moved to the lower position and capacitance 13 is charged from the direct current source through resistance 14, switch 17, the anode-cathode circuit of electric discharge device 15 and resistance 23. During the charging of the capacitance 13, the potential of cathode 7 is lowered relative to the potential of the control member 8, and the period of time during which a sufficient differential of potential between these two members is effective to cause conduction of current by discharge device 15 is determined principally by the charging time of the capacitance 13. That is, at the instant of closing switch 17 to the lower position, the potential of cathode 7 is lowered, due to the drop in voltage through resistance 14, and gradually rises as the capacitance 13 is charged. Electric valve means 4 is rendered conductive at a precise time during the cycle of voltage of circuit 2 determined by the conjoint operation of the voltage of peaked wave form produced by secondary winding 32 and the voltage due to the charging of capacitance 13. The period of time during which the electric valve means 4 is rendered conducting is determined by the charging time of capacitance 13. Electric valve means 4, therefore, conducts current to the primary winding of the transformer 3. During the succeeding half cycle of voltage of opposite polarity, the electric valve means 5 conducts current to the primary winding of transformer 3. The electric valve means 5 trails the operations of electric valve means 4 by virtue of the operation of the circuit including electric discharge device 41. When electric valve means 4 transmits a half cycle of current to the primary winding of transformer 3, electric discharge device 41 is rendered conducting by means of the voltage in primary winding 46 of transformer 45. This voltage is sufficient to overcome the effect of the biasing potential provided by winding 39 of transformer 36. Inasmuch as the electric discharge device 41 is rendered conducting and is of the gaseous type, it continues to conduct current for the duration of the positive half cycle of voltage and produces a voltage which is sufficient when cooperating with winding 33 to overcome the effect of the biasing potential provided by secondary winding 38. Electric valve means 5 is rendered conducting at a precise time during its positive half cycles of applied anode-cathode voltage due to the fact that the voltage produced across resistance 43, acting in conjunction with the peaked voltage produced by secondary winding 33, renders the electric valve means 5 conducting at a precise instant. In this manner, both electric valve means 4 and 5 are rendered conducting at exactly the same instants during the respective positive half cycles of applied anode-cathode voltage, and those instants are determinable or controllable by means of the phase shifting device 48.

The operation of the embodiment of my invention shown in Fig. 1 may be more fully appreciated by referring to the operating characteristics shown in Fig. 2. Curve A represents the voltage of the alternating current circuit 2, and the vertical lines B represent the phase position of the voltage of peaked wave form produced by transformer 25 and which renders the electric discharge device 15 conducting. Curve C represents the timing voltage produced by the charging of capacitance 13 and determines the number of half cycles of the voltage of circuit 2 during which electric valve means 4 and 5 conduct current. The vertical lines D and E represent the phase positions of the voltages of peaked wave form produced by secondary windings 32 and 33 of transformer 30, and curves F represent the current conducted to the welding circuit 1. The positive curves F represent the impulses of current supplied by electric valve means 4; and the negative curves F represent the impulses of current transmitted by electric valve means 5.

The magnitude of the current supplied to the welding circuit is controlled by means of the phase shifting device 48. Adjustment of this device correspondingly controls the conductivity of both the electric valve means 4 and 5 and in this manner effects control of the current transmitted during half cycles of voltage of both polarities of circuit 2, even though the timing voltage produced by adjustment of timing contact 34 may be adjustable or controllable in only one-cycle steps.

An important advantage of apparatus built in accordance with my invention is the precise control of the amount of current transmitted to the welding circuit 1 by controlling the average value or rms value of current during half cycles of voltage of both polarities derived from the alternating current circuit 2. Due to the fact that a single control device adjusts the peaked voltages supplied to both electric valve means 4 and 5, the electric valve means are controlled under all conditions so that each electric valve conducts exactly the same amount of current.

Fig. 3 represents a modification of my invention in which the electric valve means 4 and 5 are used as control valves for the main or power electric valves 49 and 50 which are reversely connected between the source 2 and the transformer 3. The electric valve means 4 and 5 transmit impulses of current to the immersion-igniter type control members 51 of the power electric valves 49 and 50 hence render these electric valves conducting. The control system, when applied in this manner, is otherwise the same as that shown in Fig. 1. The grid or control members 8 of electric valve means 4 and 5 are energized from the control apparatus shown in Fig. 1 and are rendered conducting during a predetermined number of cycles of voltage of supply circuit 2 and respectively control the conductivities of electric valves 49 and 50. The control system when applied in this manner also controls the power valves 49 and 50 so that each conducts the same amount of current during the respective half cycles of conduction.

A further embodiment of my invention is shown in Fig. 4 and incorporates many of the elements diagrammatically illustrated in Fig. 1; corresponding elements have been assigned like reference numerals. In the arrangement of Fig. 4, I provide a transformer 52 having a primary winding 53 and secondary windings 54 and 55, which in cooperation with electric discharge device 56 and electric discharge device 40, control the conductivities of electric valve means 4 and 5 and the power electric valves 49 and 50 in order to control the current transmitted to the welding circuit 1, so that the same amount of current is transmitted during half cycles of voltage of both polarities of the alternating current supply circuit 2. The electric discharge device 56 may be of the type comprising an ionizable medium, such as a gas or a vapor, and includes a control grid 57 which is energized by the timing voltage derived from the timing circuit 10 through conductors 28 and 29. Transformer 52, through secondary winding 54, introduces into the control circuit for electric valve means 4 an alternating biasing voltage which tends to maintain the electric discharge device 4 nonconducting and which is of a magnitude sufficient to prevent the peaked voltage furnished by secondary winding 32 from rendering electric valve means 4 conducting. This alternating voltage may be arranged to operate as a biasing voltage by controlling or adjusting its phase relationship with respect to the anode-cathode voltage of the electric discharge device 4. When the phase relationship is substantially 180 degrees relative to the anode-cathode voltage, it will be appreciated that during the positive half cycles of voltage applied to the electric discharge device the biasing potential will be negative so that the grid is maintained at a lower potential than the cathode and, hence, the electric discharge device 4 will be maintained nonconducting. A suitable self-biasing circuit, such as a parallel connected resistance 58 and a capacitance 59, may also be connected in series relation with the grid or control member 8 of the electric valve means 4. In order to reduce the magnitude of the biasing voltage produced by secondary winding 54 and to permit thereby the peaking voltage furnished by secondary winding 32 to render the electric valve means 4 conducting, I employ resistances 60 and 61 connected in circuit with the anode-cathode circuit of electric discharge device 56 and secondary winding 54 so that when the electric discharge device 56 conducts current, the magnitude of the biasing potential is substantially reduced. The electric discharge device 56 is connected in a manner such that it reduces the magnitude of the negative portion or negative half cycles of the alternating biasing voltage provided by secondary winding 54, thereby raising the level of the resultant potential of control member 8 and permitting the peaked voltage to render electric valve means 4 conducting.

The peaked voltage furnished by secondary winding 33 of peaking transformer 30 is connected in circuit with control member 8 of electric valve means 5 through a self-biasing circuit comprising resistance 62 and capacitance 63, through a portion of a resistance 64 and secondary windings 38 and 47 of transformers 36 and 45, respectively.

Phase shifting circuit 48 is shown somewhat in detail and may comprise a suitable transformer winding 65 provided with an electrically intermediate connection 66 and includes phase shifting means such as a capacitance 67 and an adjustable resistance 68. The common juncture 69 of capacitance 67 and resistance 68 is connected to the primary winding 31 of peaking transformer 30 and to the intermediate connection 67 of winding 65 through a resistance 70 and a suitable filtering means comprising a capacitance 71 and an inductance 72. The filtering means serves to suppress undesirable harmonic voltages which may be present in the phase shifting circuit.

The operation of the embodiment of my invention shown in Fig. 4 is substantially the same as that explained in connection with the arrangement of Fig. 1 with the exception of the improved circuit for controlling the conductivity of the electric valve means 4. The arrangement of Fig. 4, particularly that comprising the transformer 52 and the electric discharge device 56, affords a very precise manner of rendering the electric valve means 4 conductive at a predetermined time during positive half cycles of applied anode-cathode voltage. So long as no timing voltage is impressed across conductors 28 and 29, the welding circuit 1 is not energized. Under this condition of operation, the electric discharge devices are maintained nonconducting and the electric discharge device 56, in particular, is maintained nonconducting by virtue of the negative potential impressed on its grid 57 through conductor 29. However, upon moving switch 17 in Fig. 1 to the lower position, the charging of capacitance 13 raises the potential of grid 57 to a positive value to render electric discharge device 56 conducting for a predetermined time corresponding to a predetermined number of half cycles, or cycles, of voltage of circuit 2. When electric discharge device 56 conducts current, it partially or entirely suppresses the negative half cycles of biasing voltage provided by secondary winding 54 of transformer 52, thereby permitting the peaked voltage of secondary winding 32 to render electric valve means 4 conducting. Accordingly, energizing current is transmitted to the immersion-ignitor control member 51 of electric valve means 49 and a half cycle of current is transmitted to the welding circuit 1. The energization of the transformer 3 by electric valve means 49 effects energization of transformer 45, introducing in the control circuit of electric discharge device 41 a voltage of sufficient magnitude to overcome the effect of the biasing potential produced by transformer 36, thereby rendering electric discharge device 41 conducting. When the electric discharge device 41 becomes conducting, it produces a positive voltage across the lower portion of resistance 64 which reduces the biasing voltage produced by winding 55 permitting the peaked voltage produced by secondary winding 33 to render the electric valve means 5 conducting. Consequently, energizing current is transmitted to the control member of electric valve means 50 and a half cycle of current of opposite polarity is transmitted to the welding circuit 1. It will be noted that the times at which the electric valves 49 and 50 are rendered conducting, are precisely determined by the peaked voltages produced by transformer 30, thereby controlling the system so that the current transmitted to the welding circuit during each half cycle is exactly the same, and by utilizing a timing or control circuit applied to only one of the main or control electric valve means.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a load circuit, electric translating apparatus connected between said circuits and comprising a pair of electric valve means for controlling the transfer of power between said circuits and each comprising a control member, means connected to the control member of one of said electric valve means for rendering said one electric valve means conductive during a predetermined portion of a half cycle of anode-cathode voltage, and means for rendering the other electric valve means conducting during a succeeding half cycle of anode-cathode voltage for a period of time corresponding to the period of conduction of said one electric valve means and comprising means for impressing on the control member of the other electric valve means a biasing voltage tending to maintain said other electric valve means nonconducting, means for impressing on the control member of said other electric valve means a voltage of peaked wave form of a magnitude insufficient in itself to render said other electric valve means conducting and means responsive to the operation of said one electric valve means for producing a voltage sufficient to overcome the effect of the biasing voltage thereby permitting said voltage of peaked wave form to render said other electric valve means conducting.

2. In combination, an alternating current circuit, a load circuit, electric translating apparatus connected between said circuits and comprising a pair of electric valve means for controlling the transfer of power between said circuits and each comprising a control member, means connected to the control member of one of said electric valve means for rendering said one electric valve means conducting during a predetermined portion of a half cycle of anode-cathode voltage, and means for rendering the other electric valve means conductive during a succeeding half cycle of anode-cathode voltage for a period of time corresponding to the period of conduction of said one electric valve means and comprising means for impressing on the control member of the other electric valve means a biasing voltage tending to maintain said electric valve means nonconducting, an electric circuit comprising an electric discharge device for impressing on the control member of said other electric valve means a voltage to render said other electric valve means conducting, said electric discharge device having a control grid, and means responsive to the conductivity of said one electric valve means for energizing said grid.

3. In combination, an alternating current circuit, a load circuit, electric translating apparatus connected between said circuits and comprising a pair of electric valve means for controlling the transfer of power between said circuits and each comprising a control member, means connected to the control member of one of said electric valve means for rendering said one electric valve means conductive during a predetermined portion of a half cycle of anode-cathode voltage, and means for rendering the other electric valve means conductive during a succeeding half cycle of anode-cathode voltage for a period of time corresponding to the period of conduction of said one electric valve means and comprising means for impressing on the control member of the other electric valve means a voltage tending to maintain said one electric valve means nonconducting, means for impressing on the control member of said other electric valve means a voltage of peaked wave form of a magnitude insufficient in itself to render said other electric valve means conducting and a circuit responsive to the operation of said one electric valve means comprising an electric discharge device and an impedance element for producing a voltage sufficient to overcome the effect of said biasing voltage thereby permitting said voltage of peaked wave form to render said other electric valve means conducting.

4. In combination, an alternating current circuit, a load circuit, electric translating apparatus connected between said circuits and comprising a pair of electric valve means for controlling the transfer of power between said circuits and each comprising a control member, means connected to the control members of the electric valve means tending to maintain said electric valve means nonconducting, means including a device for producing a voltage of peaked wave form, means energized from said device for impressing on the control member of one of said electric valve means said peaked voltage to render said one electric valve means conductive during a predetermined portion of a half cycle of anode-cathode voltage, means energized from said device for impressing on the control member of the other electric valve means a voltage of peaked wave form of a value insufficient in itself to overcome the effect of said biasing potential, and a circuit responsive to the energization of said load circuit for overcoming the effect of said biasing potential to render said other electric valve means conducting.

5. In combination, an alternating current circuit, a load circuit, electric translating apparatus connected between said circuits and comprising a pair of electric valve means for controlling the transfer of power between said circuits and each comprising a control member, means connected to the control members of the electric valve means tending to maintain said electric valve means nonconducting, means including a device for producing a voltage of peaked wave form, means energized from said device for impressing on the control member of one of said electric valve means said peaked voltage to render said one electric valve means conductive during a predetermined portion of a half cycle of anode-cathode voltage, means energized from said device for impressing on the control member of the other electric valve means a voltage of peaked wave form of a value insufficient in itself to overcome the effect of said biasing potential, and a circuit for producing a voltage sufficient to overcome the effect of said biasing potential thereby permitting the second mentioned voltage of peaked wave form to render said other electric valve means conducting comprising an impedance element and an electric discharge device and means responsive to the conductivity of said one electric valve means for controlling the conductivity of said electric discharge device.

6. In combination, an alternating current circuit, a load circuit, electric translating apparatus connected between said circuits and comprising a pair of electric valve means for controlling the transfer of power between said circuits and each comprising a control member, means connected to the control member of one of said electric valve means for rendering said one electric valve means conductive during a predetermined portion of a cycle of anode-cathode voltage, and means for controlling said pair of electric valve means in a leading and trailing relationship so that said other electric valve means is rendered conducting during a predetermined portion of a succeeding half cycle of anode-cathode voltage and comprising means for impressing on the control member of said other electric valve means a biasing voltage tending to maintain said other electric valve means nonconducting, means for impressing on the control member of said other electric valve means a voltage of peaked wave form of a magnitude insufficient in itself to render said other electric valve means conducting and means responsive to the conductivity of said one electric valve means for producing a voltage sufficient to overcome the effect of said biasing voltage thereby permitting said voltage of peaked wave form to render said other electric valve means conducting.

7. In combination, an alternating current circuit, a load circuit, electric translating apparatus connected between said circuits and comprising a pair of reversely connected electric valve means for controlling the transfer of power between said circuits and each comprising a control member, means for impressing on the control members biasing potentials tending to maintain said electric valve means nonconducting, means for superimposing on said biasing potentials voltages of peaked wave form of a magnitude insufficient in itself to overcome the effect of said biasing potentials to render said electric valve means conducting at the same instants in the respective positive half cycles of applied anode-cathode voltages, means for impressing on the control member of one of said electric valve means a voltage sufficient to overcome the effect of the biasing potentials thereby permitting the voltage of peaked wave form to render said electric valve means conducting, and means responsive to the conductivity of said one electric valve means for impressing on the control member of said other electric valve means a voltage sufficient to overcome the effect of said biasing potential thereby rendering said other electric valve means conducting for a period of time corresponding to the period of conduction of said one electric valve means.

8. In combination, an alternating current supply circuit, an alternating current load circuit, electric translating apparatus connected between said circuits and comprising a pair of reversely connected electric valve means each having a control member, means for impressing on the control members of said pair of electric valve means biasing potentials tending to maintain said electric valve means nonconducting, means for impressing on said control members periodic voltages of peaked wave form having the same predetermined phase relation relative to the anode-cathode voltages of the respective electric valve means but of values insufficient in themselves to render said electric valve means conducting, means for controlling the phase of said periodic voltages of peaked wave form to control the power transmitted to said load circuit, means for impressing on the control member of said one electric valve means a voltage sufficient to overcome the effect of the associated biasing potential thereby rendering said one electric valve means conducting, and means responsive to the current conducted by said one electric valve means for impressing on the control member of said other electric valve means a voltage sufficient to overcome the effect of the biasing potential thereby rendering said other electric valve means conducting for a period of time corresponding to the period of conduction of said one electric valve means.

9. In combination, an alternating current supply circuit, a load circuit, electric translating apparatus connected between said circuits and comprising a pair of electric valve means each having a control member, means for impressing on said control members biasing potentials tending to maintain said electric valve means nonconducting, means for impressing on the control members periodic voltages of peaked wave form having the same predetermined phase relationship relative to the respective anode-cathode voltages of the associated electric valve means but of values insufficient in themselves to overcome the effect of the biasing potentials, a timing circuit for impressing on the control member of one of said electric valve means a voltage sufficient to overcome the effect of the biasing potential thereby rendering said one electric valve means conducting for a predetermined number of half cycles of voltage of predetermined polarity, and means for impressing on the control member of the other electric valve means a voltage sufficient to overcome the effect of the associated biasing potential thereby rendering said other electric valve means conducting for a corresponding number of half cycles of voltage of opposite polarity and during periods of time during each half cycle corresponding in length to the periods of conduction of said one electric valve means.

10. In combination, an alternating current supply circuit, a load circuit, electric translating apparatus connected between said circuits and comprising an electric valve means having an anode, a cathode and a control member for controlling the transfer of power between said supply circuit and said load circuit, an excitation circuit for energizing said control member comprising means for impressing on said control member an alternating component of voltage poled relative to the anode-cathode voltage of said electric valve means in a manner tending to render said electric valve means conducting at a predetermined time during the positive half cycles of anode-cathode voltage, means for superimposing on said first mentioned component of voltage an alternating biasing voltage tending to render ineffective the first mentioned component, and means responsive to an electrical condition of said translating apparatus for producing a unidirectional voltage which is opposite in effect to that of said biasing voltage to reduce the effective magnitude of said biasing voltage and to permit the first mentioned component of voltage to render said electric valve means conducting.

11. In combination, an alternating current supply circuit, a load circuit, electric translating apparatus connected between said circuits and comprising an electric valve means having an anode, a cathode and a control member for controlling the transfer of power between said supply circuit and said load circuit, an excitation circuit comprising means for impressing on said control member a negative unidirectional biasing potential, means for impressing on said control member an alternating component of voltage poled relative to the anode-cathode voltage in a manner tending to render said electric valve means conductive at a predetermined time during the positive half cycles of applied anode-cathode voltage, means for superimposing on the first mentioned alternating component a component of bias voltage tending to maintain said electric valve means nonconducting, and means responsive to an electrical condition of said translating apparatus for producing a unidirectional voltage which is opposite in effect to that of said biasing voltage and for reducing the effective magnitude of the bias voltage so that the first mentioned component of voltage is effective to render said electric valve means conducting.

12. In combination, an alternating current supply circuit, a load circuit, electric translating apparatus connected between said circuits and comprising an electric valve means having an anode, a cathode and a control member for controlling the transfer of power between said supply circuit and said load circuit, an excitation circuit comprising means for impressing on said control member a negative unidirectional biasing potential, means for impressing on said control member an alternating component of voltage poled relative to the anode-cathode voltage in a manner tending to render said electric valve means conductive at a predetermined time during the positive half cycles of applied anode-cathode voltage, means for superimposing on the first mentioned component an alternating component of bias voltage, and means responsive to an electrical condition of said translating apparatus comprising an electric discharge device for producing a unidirectional voltage and for reducing the effective magnitude of said bias voltage so that the first mentioned component of voltage is effective to render said electric valve means conducting.

13. In combination, an alternating current supply circuit, a load circuit, electric translating apparatus connected between said circuits and comprising an electric valve means for controlling the transfer of current between said supply circuit and said load circuit and comprising an anode, a cathode and a control member, an excitation circuit for energizing said control member comprising means for impressing thereon a periodic voltage tending to render said electric valve means conducting at a predetermined instant during the cycles of anode-cathode voltage, means for superimposing on said periodic voltage an alternating biasing potential sufficient to overcome the effect of said periodic voltage, and means responsive to an electrical condition of said translating apparatus and for producing a unidirectional voltage to reduce the effective magnitude of said biasing potential thereby permitting said periodic voltage to render said electric valve means conducting.

14. In combination, an alternating current supply circuit, a load circuit, electric translating apparatus connected between said circuits and comprising an electric valve means for controlling the transfer of current between said supply circuit and said load circuit and comprising an anode, a cathode and a control member, an excitation circuit for energizing said control member comprising means for impressing thereon a periodic voltage tending to render said electric valve means conducting at a predetermined instant during the cycles of anode-cathode voltage, means for superimposing on said periodic voltage an alternating biasing potential sufficient to overcome the effect of said periodic voltage, and means comprising an electric discharge device for substantially reducing the magnitude of said biasing voltage thereby permitting said periodic voltage to render said electric valve means conducting.

15. In combination, an alternating current supply circuit, a load circuit, electric translating apparatus connected between said circuits and comprising an electric valve means for controlling the transfer of current between said supply circuit and said load circuit and comprising an anode, a cathode and a control member, an excitation circuit for energizing said control member comprising means for impressing thereon a periodic voltage tending to render said electric valve means conducting at a predetermined instant during the cycles of anode-cathode voltage, means for superimposing on said periodic voltage an alternating biasing potential sufficient to overcome the effect of said periodic voltage, and means connected to said last mentioned means and comprising an impedance element and an electronic discharge device for transmitting current through said impedance element thereby reducing the magnitude of said biasing potential sufficiently to permit said periodic voltage to render said electric valve means conducting.

MAURICE E. BIVENS.